United States Patent
Kawaguchi et al.

(10) Patent No.: US 6,654,529 B1
(45) Date of Patent: Nov. 25, 2003

(54) FERROELECTRIC DOMAIN INVERTED WAVEGUIDE STRUCTURE AND A METHOD FOR PRODUCING A FERROELECTRIC DOMAIN INVERTED WAVEGUIDE STRUCTURE

(75) Inventors: Tatsuo Kawaguchi, Gifu Pref. (JP); Minoru Imaeda, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/375,132

(22) Filed: Aug. 16, 1999

(30) Foreign Application Priority Data

Aug. 19, 1998 (JP) .......................................... 10-232575

(51) Int. Cl.$^7$ ................................................ G02B 6/00
(52) U.S. Cl. ...................... 385/122; 385/129; 385/130; 385/131; 359/332
(58) Field of Search .................. 385/122, 129–132; 359/332

(56) References Cited

U.S. PATENT DOCUMENTS

| | | | | |
|---|---|---|---|---|
| 3,808,674 A | * | 5/1974 | Francombe et al. .......... 117/94 |
| 5,521,750 A | | 5/1996 | Onoe et al. |
| 5,558,946 A | * | 9/1996 | Nishimoto ................... 428/692 |
| 5,567,979 A | * | 10/1996 | Nashimoto et al. ......... 257/627 |
| 5,576,879 A | * | 11/1996 | Nashimoto ................... 359/248 |
| 5,621,681 A | * | 4/1997 | Moon .......................... 365/145 |
| 5,650,362 A | * | 7/1997 | Nashimoto ............... 427/126.3 |
| 5,656,382 A | * | 8/1997 | Nashimoto ................... 428/620 |
| 5,776,621 A | * | 7/1998 | Nashimoto ................... 428/688 |
| 5,851,844 A | * | 12/1998 | Ooms et al. ..................... 438/3 |
| 5,852,703 A | * | 12/1998 | Nashimoto ................... 385/130 |
| 5,943,465 A | * | 8/1999 | Kawaguchi et al. ......... 385/122 |
| 6,002,515 A | * | 12/1999 | Mizuuchi et al. ............ 359/326 |
| 6,117,346 A | * | 9/2000 | Kawaguchi et al. ......... 385/146 |
| 6,333,943 B1 | * | 12/2001 | Yamamoto et al. .......... 385/129 |

FOREIGN PATENT DOCUMENTS

| | | |
|---|---|---|
| JP | 10-231770 | * 8/1988 |
| JP | 5-173213 | 7/1993 |
| JP | 6-67233 | 3/1994 |
| JP | 6-160927 | 6/1994 |
| JP | 7-20515 | 1/1995 |

OTHER PUBLICATIONS

Patent Abstracts of Japan, vol. 018, No. 306 (p–1752), Jun. 10, 1994 & JP 06 067233 A, Mar. 11, 1994.
Momiji H et al. "Fabrication of a periodically domain–inverted structure in LiNbO/sub 3/ thin film by a domain–transfer technique," Applied Physics Letters, Oct. 24, 1994, vol. 65, No. 17, pp. 2154–2155, XP 002160452.
Mizzuuchi K et al. "Harmonic Blue Light Generation in X–Cut MGO: LINBO3 Waveguide," Electronics Letters, GB, IEE Stevenage, vol. 33, No. 9, Apr. 24, 1997, pp. 806–807, XP 000695345.

* cited by examiner

*Primary Examiner*—Michael P. Stafira
*Assistant Examiner*—Juan D. Valentin, II
(74) *Attorney, Agent, or Firm*—Burr & Brown

(57) ABSTRACT

A method for producing an optical waveguide part includes the steps of preparing a ferroelectric single crystalline substrate having a polarization-axis substantially parallel to a main surface thereof and having a given ferroelectric domain-inverted pattern, and epitaxially growing a ferroelectric single crystalline film on the ferroelectric single crystalline substrate. The ferroelectric domain-inverted pattern is thereby transcribed from the substrate into the ferroelectric single crystalline film to form a ferroelectric domain-inverted structure therein.

8 Claims, 4 Drawing Sheets

FIG. 1 - Prior Art
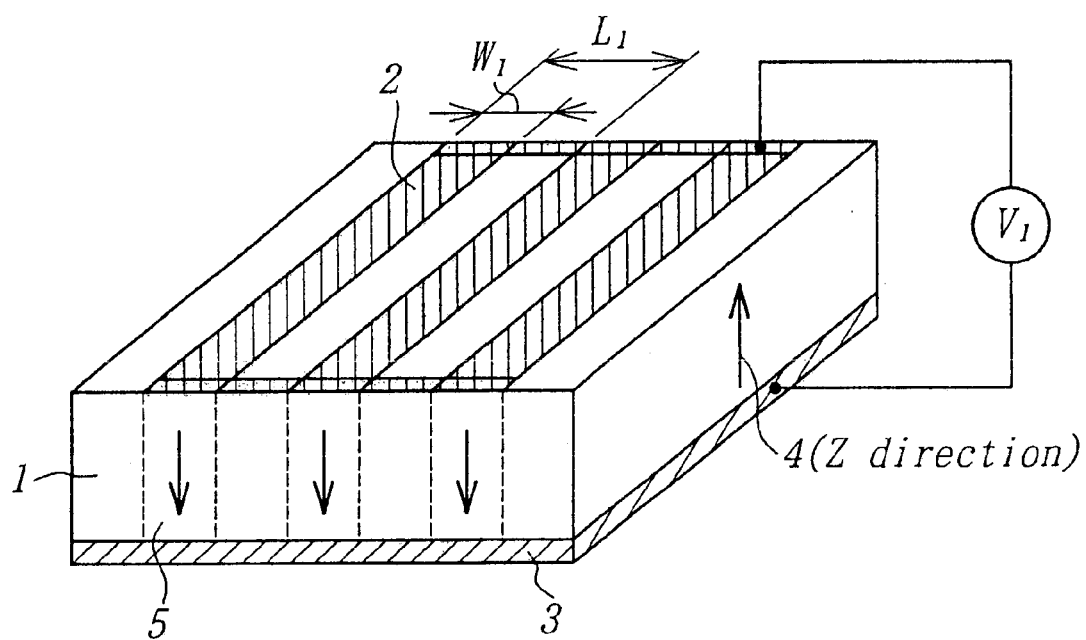

FIG. 2a - Prior Art
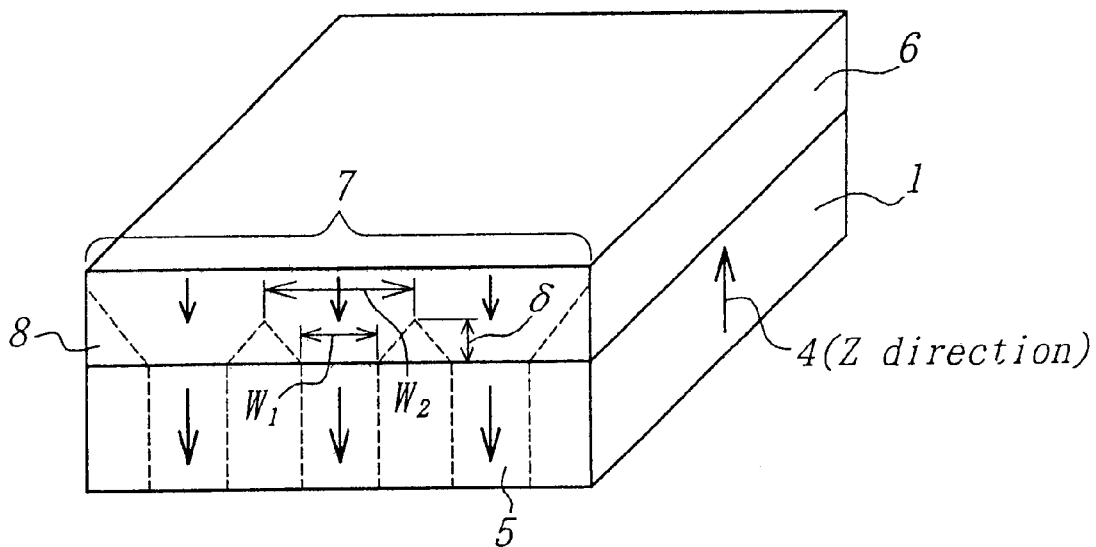
FIG. 2b - Prior Art
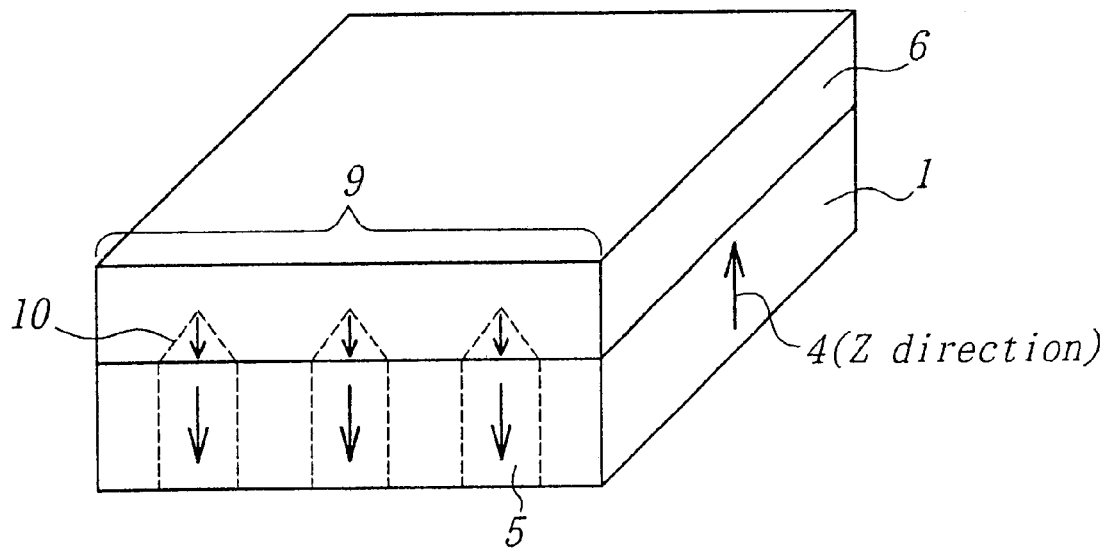

FERROELECTRIC DOMAIN INVERTED WAVEGUIDE STRUCTURE AND A METHOD FOR PRODUCING A FERROELECTRIC DOMAIN INVERTED WAVEGUIDE STRUCTURE

BACKGROUND OF THE INVENTION

1. Field of the Invention

This invention relates to a method for producing an optical waveguide part and an=optical waveguide part, more particularly a method for producing an optical waveguide part and an optical waveguide part suitable for a second harmonic generation (SHG) device utilizing a Quasi-Phase-Matching (QPM) system.

2. Related Art Statement

As a light source for a blue laser usable for an optical pickup, etc., a SHG device, utilizing a QPM system, is expected, which comprises an optical waveguide made of a ferroelectric single crystal such as a lithium niobate single crystal or a lithium tantalate single crystal. The optical waveguide has a periodically ferroelectric domain-inverted structure. The device may be widely used for optical disk memory, medicine, optochemical, a use of an optical pickup for various optical measurement.

In the SHG device, for obtaining a high conversion efficiency, the ferroelectric single crystal is required to have a ferroelectric domain-inverted structure with deep domains.

As a method for forming deep ferroelectric domain-inverted structures, a ferroelectric domain-inverted pattern is formed in a given ferroelectric single crystalline substrate, a ferroelectric single crystalline film is epitaxially grown on the substrate, and the pattern is transcribed and formed in the film.

For example, JP A 5-173213, JP A 6-67233, and JP A 6-160927 disclose the following method. That is, a ferroelectric single crystalline substrate 1, made of Z-cut lithium niobate single crystal, lithium tantalate or the like, is prepared. Then, as shown in FIG. 1, a rectangular electrode 2 is formed on one main surface of the substrate 1 and a planar electrode 3 is formed on the other main surface, and a given voltage $V_1$ is supplied between the electrodes 2 and 3. Thereafter, as shown in FIG. 2, a ferroelectric single crystalline film 6 is formed on the substrate 1 by a liquid epitaxial method and a ferroelectric domain-inverted pattern 5 of the substrate 1 is transcribed into the film to form a ferroelectric domain-inverted structure therein.

"J. Appl. Phys. Lett." No. 65, 1994, p2154–2155 discloses a method in which a periodically ferroelectric domain-inverted pattern is formed in a ferroelectric single crystalline substrate made of a Z-cut lithium niobate single crystal by a Ti diffusion method, a ferroelectric crystalline film made of a lithium niobate single crystal is epitaxially grown on the substrate, and the pattern is transcribed into the film to form a ferroelectric domain-inverted structure therein.

In each of the above methods, however, a Z-cut face of a ferroelectric single crystal is employed as the ferroelectric single crystalline substrate. Thus, as shown in FIGS. 2(a) and 2(b), the ferroelectric domain-inverted structure, transcribed into the ferroelectric single crystalline film, which is formed by the liquid phase epitaxial method, has only ferroelectric domain-inverted structures 7 and 9 having ferroelectric domain-inverted patterns 8 and 10 with a period of about 1 $\mu$m of which width is increased or decreased with a growth of the ferroelectric single crystalline film 6. Consequently, it is difficult to form a ferroelectric domain-inverted structure having a rectangular pattern with deep domains.

"J. Appl. Phys. Lett." No. 65, 1994, p2154–2155 also describes the above fact.

SUMMARY OF THE INVENTION

It is an object of the present invention to provide an optical waveguide part with a ferroelectric domain-inverted structure having a deeply rectangular pattern in a ferroelectric single crystal and a method for producing the same.

This invention relates to a method for producing an optical waveguide part, including the steps of preparing a ferroelectric single crystalline substrate having a polarization-axis substantially parallel to a main surface thereof and having a given ferroelectric domain-inverted pattern, and epitaxially growing a ferroelectric single crystalline film on the ferroelectric single crystalline substrate. The ferroelectric domain-inverted pattern is thereby transcribed from the substrate into the ferroelectric single crystalline film to form a ferroelectric domain-inverted structure therein.

This invention also relates to an optical waveguide part, including a ferroelectric single crystalline substrate having a given ferroelectric domain-inverted pattern and a ferroelectric single crystalline film having a ferroelectric domain-inverted structure composed of a ferroelectric domain-inverted pattern with substantially the same shape, as viewed in a vertical direction to the optical waveguide part, as the one of the ferroelectric single crystalline substrate.

In the conventional method, as mentioned above, in which the ferroelectric domain-inverted pattern is transcribed and formed in the ferroelectric single crystalline film, a polarization-axis of the film is parallel to a Z-axis thereof, so that a relatively deep ferroelectric domain-inverted is likely to be formed along the Z-axis. Thus, it is conventionally known to use a Z-cut ferroelectric single crystalline substrate. However, there has been no detailed investigation concerning other cut-faces of ferroelectric single crystalline substrates.

The inventors discovered the following facts. That is, a ferroelectric single crystalline substrate 11, made of an X-cut lithium niobate single crystal, is prepared and an comb-shaped electrode 12 and a uniform electrode 13 are formed on the substrate 11. Then, a voltage $V_2$ parallel to a main surface of the substrate 11 is supplied to the substrate 11 to form a ferroelectric domain-inverted pattern 15. Next, a ferroelectric single crystalline film 16, made of a lithium niobate, is formed on the substrate 11 by the liquid phase epitaxial method and thereby a deeply rectangular ferroelectric domain-inverted pattern 18 is transcribed and formed from the ferroelectric domain-inverted pattern 15. The present invention is based on the above finding.

According to the present invention, there can be provided an optical waveguide part having a ferroelectric domain-inverted structure 17 with a rectangular pattern including deep domains of which each has parallel ferroelectric domain-boundaries. Thus, a QPM-SHG device having a high conversional efficiency can be obtained.

As discussed above, when employing a ferroelectric single crystalline substrate having a ferroelectric polarization-axis substantially parallel to a main surface of the substrate, a ferroelectric domain-inverted structure having a rectangular ferroelectric domain-inverted pattern is formed in a ferroelectric single crystalline film formed on the main surface of the substrate. The inventors could find no clear reason for this, but is presumed to be the following.

That is, it is presumed that since an interface energy of a ferroelectric domain-boundary (between an inverted part and a non-inverted part) in forming the ferroelectric domain-inverted pattern vertical to a Z-axis is smaller than one in forming it parallel to the Z-axis, the shape of the inverted pattern is unlikely to degrade.

BRIEF DESCRIPTION OF THE DRAWINGS

For a better understanding of this invention, reference is made to the attached drawings, wherein:

FIG. 1 is a view for explaining a method for forming a ferroelectric domain-inverted pattern in a ferroelectric single crystalline substrate according to a conventional method;

FIG. 2 is a view for explaining a method for forming a ferroelectric domain-inverted structure in a ferroelectric single crystalline film according to a conventional method;

DETAILED DESCRIPTION OF THE INVENTION

This invention is described in detail hereinafter, with reference to the attached drawings.

In this invention, the ferroelectric single crystalline substrate has to have a polarization-axis substantially parallel to a main surface of the substrate.

The wording "substantially parallel to a main surface of the substrate" means that in applying an optical waveguide part shown in FIG. 5 for a QPM-SHG device, a ferroelectric domain-inverted structure transcribed and formed in a ferroelectric single crystalline film has a ferroelectric domain-inverted pattern parallel to a surface of the film so that a polarized light (TE mode) of a second harmonic wave can propagate. It concretely means an angle range of 0 degree to 10 degrees in between the main surface of the substrate and the polarization-axis, besides perfectly parallel.

As the ferroelectric single crystalline substrate, a well known ferroelectric single crystal may be used, such as lithium niobate ($LiNbO_3$), lithium tantalate ($LiTaO_3$), potassium lithium tantalate ($K_3Li_2Nb_5O_{15}$), lithium niobate-lithium tantalate ($LiNb_{1-X}Ta_XO_3(0 \leq X \leq 1)$). In view of clear ferroelectric domain-inverted characteristics, lithium niobate, lithium tantalate, or lithium niobate-lithium tantalate single crystal may be preferably used.

For improving optical damage resistance of the substrate, at least one from a group consisting of magnesium (Mg), zinc (Zn), scandium (Sc), indium (In) may be added to the above single crystal.

Moreover, as an element for generating a laser, at least one from a lanthanide series such as neodymium (Nd), erbium (Er), thulium (Tm), holmium (Ho), dysprosium (Dy), praseodymium (Pr) may be added to the above single crystal.

In the case of using the above ferroelectric single crystal as the ferroelectric single crystalline substrate, a X-cut face, a Y-cut face, and a off-cut face of the single crystal may be used for the above requirement, but the X-cut face can be preferably used for forming clearly the ferroelectric domain-inverted structure in the ferroelectric single crystalline film.

Figure 3:
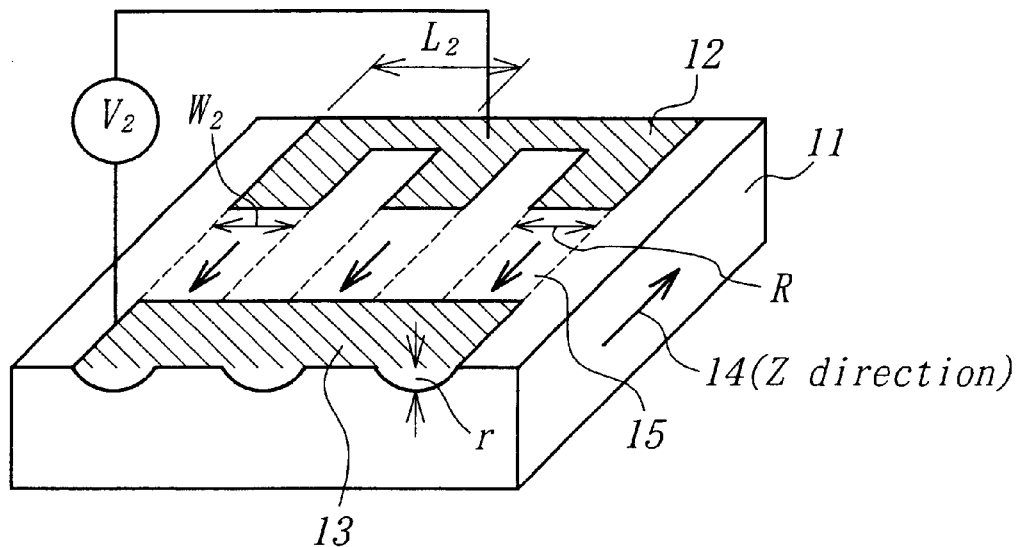
FIG. 3 is a view for explaining a method for forming a ferroelectric domain-inverted pattern in a fenoelectric single crystalline substrate according to the present invention.

Moreover, the ferroelectric single crystalline substrate in the present invention has to have a given ferroelectric domain-inverted pattern. As shown in FIG. 3, a comb-shaped electrode 12 and a uniform electrode 13 are formed on a main surface of a ferroelectric single crystalline substrate 11, which is poled in a polarization-direction (a Z-axis direction), and a voltage $V_2$ is supplied between the electrodes 12 and 13 to form a ferroelectric domain-inverted pattern 15 on the main surface of the substrate 11.

In the case of employing an optical waveguide part according to the present invention as a QPM-SHG device, a pitch $L_2$ and a width $W_2$ of the comb-shaped electrode 12 are preferably 2 $\mu$m to 10 $\mu$m, and 0.1 $\mu$m to 5 $\mu$m, respectively. The voltage $V_2$ is preferably 0.1 kV/mm to 100 kV/mm.

Figure 4:
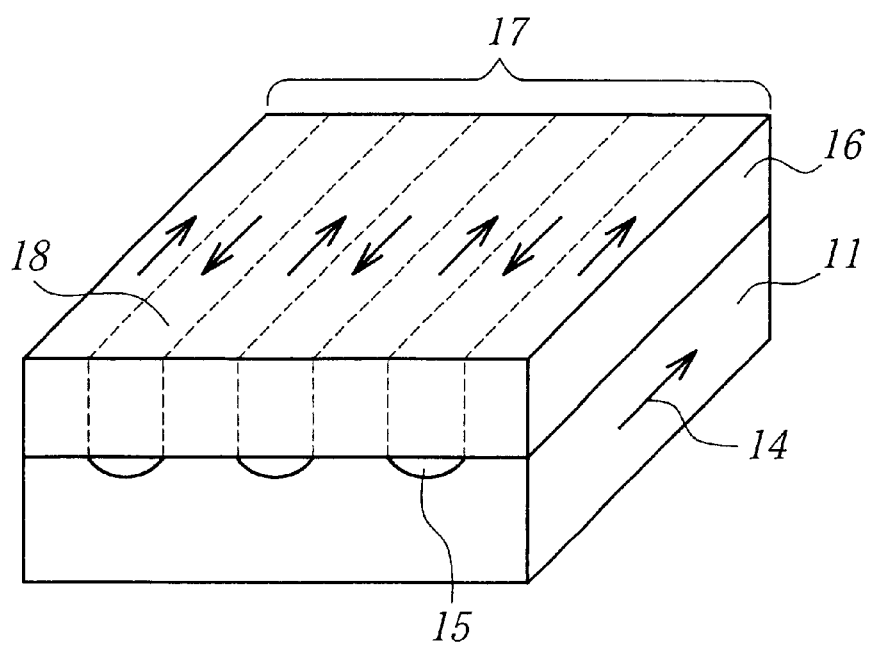
FIG. 4 is a view for explaining a method for forming a ferroelectric domain-inverted structure in a fenoelectric single crystalline film according to the present invention.

As shown in FIG. 4, a ferroelectric single crystal is grown, by a liquid phase epitaxial method, on the main surface of the ferroelectric single crystalline substrate 11 having the ferroelectric domain-inverted pattern, as discussed above, and thereby a ferroelectric single crystalline film 16 is formed.

During the growing process of the ferroelectric single crystalline film 16, the ferroelectric domain-inverted pattern 15, formed in the ferroelectric single crystalline substrate 11, is transcribed into the film 16, and a ferroelectric domain-inverted structure 17, having a rectangular ferroelectric domain-inverted pattern 18 as shown in FIG. 4, is formed in the film 16.

In the case of employing an optical waveguide part as a QPM-SHG device, the ferroelectric single crystalline film 16 has a thickness of 1 $\mu$m to 10 $\mu$m. Consequently, according to the present invention, the ferroelectric domain-inverted structure 17, having a deeply rectangular ferroelectric domain-inverted pattern with a depth of 1 $\mu$m to 10 $\mu$m, can be formed in the film 16.

As the ferroelectric single crystalline film, there may be used a ferroelectric single crystal similar to the ferroelectric single crystalline substrate 11.

In FIGS. 3 and 4, a method of supplying a voltage between two electrodes for forming a ferroelectric domain-inverted pattern in the ferroelectric single crystalline substrate 11, what is called, a voltage-supplying method is explained. However, a method for forming a ferroelectric domain-inverted pattern is not limited to the voltage-supplying method. A method such as a titanium in-diffusing method, a $Li_2O$ out-diffusing method, a $SiO_2$-cladding and heat treating method, a proton-exchange and heat treating method, or an electron beam-scanning method may be employed. For reducing an optical absorption, the ferroelectric single crystalline film 16, epitaxially grown, may be annealed in an oxidizing atmosphere composed of an oxygen gas, an ozone gas, a mixed gas thereof or the like. The annealing is preferably carried out at a temperature of 400° C. to 800° C. for 0.1 hour to 100 hours.

Figure 5A:
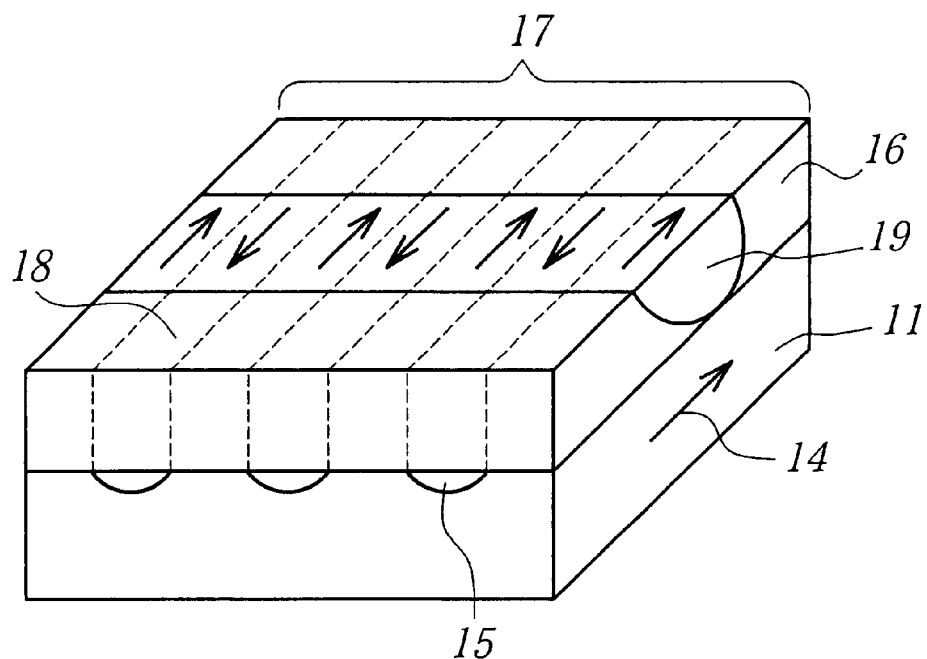
FIG. 5 is a view showing a concrete embodiment of an optical waveguide part according to the present invention.

In employing an optical waveguide part as an element such as a QPM-SHG device, the ferroelectric single crystalline film 16 is polished so that its thickness may be suitable for a mode field diameter caliber of a laser to be used. Then, as shown in FIG. 5(a), a three-dimensional optical waveguide 19 is formed by a proton-exchanging method so that its direction can be substantially vertical to the polarization-direction of the ferroelectric domain-inverted pattern of the fenoelectric domain-inverted structure 17.

Figure 5B:
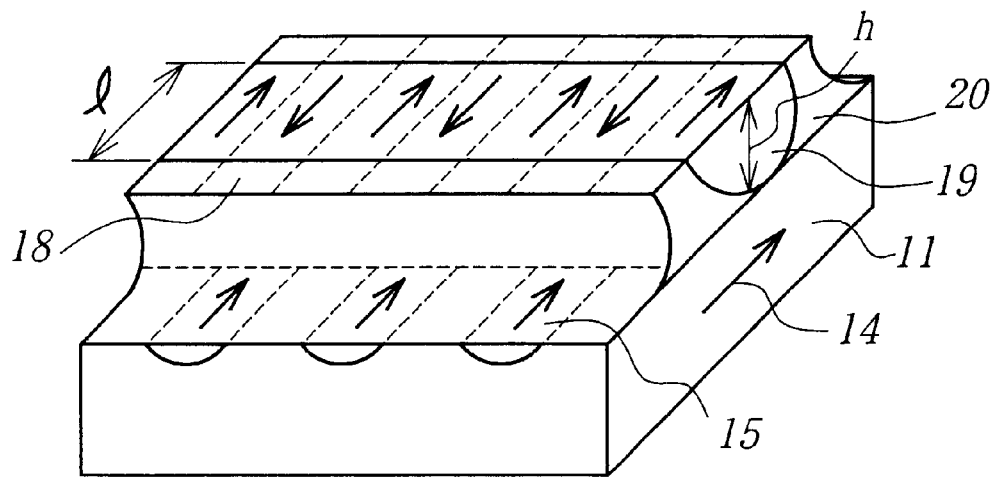

Moreover, for forming a ridge-type optical waveguide, the ferroelectric single crystalline film 16 is proton-exchanged with a mask made of tantalum and the proton-exchanged portions are etch-removed to form a ridge portion 20 as shown in FIG. 5(b), whereby the three-dimensional optical waveguide 19 may be formed.

EXAMPLES

The invention will be explained in more detail with reference to the following examples.

Example 1

In this example, as shown in FIG. 3, a ferroelectric domain-inverted pattern was formed in a ferroelectric single crystalline substrate by the voltage-supplying method. A X-cut lithium niobate single crystal was employed as the ferroelectric single crystalline substrate 11.

The comb-shaped electrode 12 having a pitch $L_2$ of 3 μm and a protrusion's width $W_2$ of 1.3 μm was formed on the main surface, in its +Z direction, of the ferroelectric single crystalline substrate 11 made of lithium niobate single crystal. The uniform electrode 13 was formed on the main surface, in its -Z direction. Then, the voltage $V_2$ of about 20 kV/mm was supplied between the electrodes and a ferroelectric domain-inverted pattern having a width R of 1.5 μm and a depth r of 1 μm was formed in the ferroelectric single crystalline substrate 11.

Then, a solute component of $LiNbO_3$ was mixed to a flux of $Li_2O-V_2O_5$ and the thus obtained melt was heated to a temperature of 900° C. The ferroelectric single crystalline substrate 11 was dipped in the melt for 20 minutes, to epitaxially grow the ferroelectric single crystalline film 16, made of lithium niobate single crystal, in a thickness of 20 μm at a film-growing rate of 1 μm/min.

The ferroelectric single crystalline substrate 11 having the ferroelectric single crystalline film 16 was cut along a vertical face to the polarization-direction (Z-direction) 14 and the thus obtained cross section was polished. Subsequently, the cross section was etched with a mixed solution of hydrofluoric acid and nitric acid and thereby ferroelectric single crystalline film 16 was investigated about its polarization structure.

As a result, it was found that a ferroelectric domain-inverted structure having a rectangular ferroelectric domain-inverted pattern with a width of 1.5 μm and a depth of 20 μm was formed therein, the pattern depending on the ferroelectric domain-inverted pattern of the ferroelectric single crystalline substrate 11.

Comparative Example 1

In this example, a ferroelectric domain-inverted pattern was formed in a ferroelectric single crystalline substrate according to a conventional method as shown in FIG. 1.

A Z-cut lithium niobate single crystal was employed as the ferroelectric single crystalline substrate 1. The rectangular electrode 2 having a pitch $L_1$ of 3 μm and an electrode width $W_1$ of 1.3 μm was formed on the main surface of the substrate 11 in a polarization direction 4 (+Z direction). The planar electrode 3 was formed on the main surface of the substrate 11 in the opposite direction to polarization direction 4 (−Z direction). Then, the voltage $V_1$ of about 20 kV/mm was supplied between the electrodes to form the ferroelectric domain-inverted pattern 5 having a width of 1.5 μm in the ferroelectric single crystalline substrate 1.

According to the same manner as in Example 1, the ferroelectric single crystalline film 6 made of lithium niobate single crystal was formed, in a thickness of 20 μm, on the main surface of the ferroelectric single crystalline substrate 1 in the +Z direction, as shown in FIG. 2. Then, the substrate 1 was cut along the vertical face to the polarization direction 4 and the thus obtained cross section was polished. Subsequently, the cross section was etched with the mixed solution of hydrofluoric acid and nitric acid and thereby the film 6 was investigated about its polarization structure.

As a result, it was found that the polarization structure was the ferroelectric domain-inverted structure 7, as shown in FIG. 2(a), having the ferroelectric domain-inverted pattern 8 enlarging it width upward. The minimum width $\omega_1$ of the pattern 8 in the film 6 contacting to the ferroelectric single crystalline substrate 1 was 1.5 μm, corresponding to the ferroelectric domain-inverted pattern 5 of the substrate 1. The maximum width $\omega_2$ of the most enlarged portion of the pattern 8 was 3 μm, and a depth δ was 0.8 μm.

Example 2

In this example, according to the same manner as in Example 1, a ferroelectric domain-inverted pattern was formed in a ferroelectric single crystalline substrate by the voltage-supplying method as shown in FIG. 3. A X-cut 5 mol % of MgO-doped lithium niobate single crystal was employed as the ferroelectric single crystalline substrate 11.

The comb-shaped electrode 12 having a pitch $L_2$ of 3.6 μm and a protrusion's width $W_2$ of 1.5 μm was formed on the main surface, in a polarization direction (+Z direction), of the substrate 11. The uniform electrode 13 was formed on the main surface, in the opposite direction to the polarization direction (-Z direction). Then, the voltage $V_2$ of about 20 kV/mm was supplied between the electrodes to form a ferroelectric domain-inverted pattern, in a width R of 1.8 μm and a depth r of 1 μm, in the substrate 11.

A mixed solute component of ZnO and $LiNbO_3$ mixed at a mole ratio of $ZnO:LiNbO_3=1:4$ was added to a flux of $Li_2O-V_2O_5$ and the thus obtained melt was heated to a temperature of 900° C. Then, the ferroelectric single crystalline substrate 11 was dipped in the melt for 3 minutes, to epitaxially grow the ferroelectric single crystalline film 16, made of ZnO-doped lithium niobate single crystal, in a thickness of 3 μm at a film growing rate of 1 μm/min.

The ferroelectric single crystalline substrate 11, having the ferroelectric single crystalline film 16, was cut along a vertical face to its polarization direction (+Z direction) and the thus obtained cross section was polished. Then, the cross section was etched with the mixed solution of hydrofluoric acid and nitric acid and thereby the film was investigated about its polarization structure.

Consequently, a ferroelectric domain-inverted structure having a rectangular ferroelectric domain-inverted pattern with a width of 1.8 μm and a depth of 3 μm, as shown in FIG. 4, was formed, corresponding to the ferroelectric domain-inverted pattern of the ferroelectric single crystalline substrate 11.

Next, the ferroelectric single crystalline film 16 was annealed at 600° C. for 3 hours under an oxidizing atmosphere of oxygen and ozone.

Thereafter, a mask pattern of tantalum with a width of 13 μm was formed on the film 16. Subsequently, the film 16 was proton-exchanged with a benzoic acidic solution and etched with a hydrofluoric acidic solution to form the ridge-type optical waveguide 9 having its depth h of 4 μm and its width of 3 μm. Lastly, by employing the optical waveguide 9 a QPM-SHG device having a device length of 10 mm was obtained.

When the device SHG properties were evaluated by using a titanium-sapphire laser, a phase-matched wavelength was 890 nm and an output power was 20 mW at a fundamental wave-input power of 50 mW.

Comparative Example 2

The ferroelectric domain-inverted pattern 15 was formed having a width R of 1.8 μm and a depth of 1 μm in the ferroelectric single crystalline substrate 11. Thereafter, without forming a ferroelectric single crystalline film on the substrate 11, an optical waveguide was formed having a width of 4 μm and a depth of 3 μm in the substrate 11 by the proton-exchanging method, and orthogonal to the ferroelectric domain-inverted pattern 15. By employing the optical waveguide, a QPM-SHG device having a device length of 10 mm was obtained.

When the device SHG properties were evaluated by using the titanium-sapphire laser, a phase-matched wavelength was 890 nm and an output power was 5 mW at the fundamental wave-input power of 50 mW.

As is apparent from the above examples and comparative examples, an optical waveguide part, having a ferroelectric domain-inverted structure with a deeply rectangular pattern in a ferroelectric single crystal, can be formed, according to the present invention.

Moreover, as is apparent from Example 2 and Comparative example 2, when an optical waveguide part having a ferroelectric domain-inverted structure with a deeply rectangular pattern, obtained according to the present invention, is applied to a QPM-SHG device, the device can have an excellent conversional efficiency.

As above mentioned, according to the present invention, an optical waveguide part having a ferroelectric domain-inverted structure with a deeply rectangular pattern in a ferroelectric single crystal can be formed, and thereby a QPM-SHG device having a good conversional efficiency can be easily provided.

What is claimed is:

1. A method for producing an optical waveguide part, comprising the steps of:

preparing a ferroelectric single crystalline substrate having a polarization-axis substantially parallel to a main surface thereof and having a given ferroelectric domain-inverted pattern, and epitaxially growing a ferroelectric single crystalline film on the ferroelectric single crystalline substrate and thereby transcribing the ferroelectric domain-inverted pattern into the ferroelectric single crystalline film to form a ferroelectric domain-inverted structure therein.

2. An optical waveguide part-producing method as defined in claim 1, wherein the ferroelectric domain-inverted pattern is formed by a voltage-supplying method.

3. An optical waveguide part-producing method as defined in claim 1 or 2, further comprising the step of annealing the ferroelectric single crystalline film under an oxidizing-atmosphere after epitaxially growing it on the ferroelectric single crystalline substrate.

4. An optical waveguide part-producing method as defined in any one of claim 1 or 2, wherein the ferroelectric single crystalline substrate is made of a single crystal having a composition of $LiNb_{1-x}TaXO_3$ ($0 \leq X \leq 1$).

5. An optical waveguide part-producing method as defined in any one of claim 1 or 2, wherein the ferroelectric single crystalline film is made of a single crystal having a composition of $LiNb_{1-x}TaXO_3$ ($0 < X < 1$).

6. An optical waveguide part, comprising: a ferroelectric single crystalline substrate having a given ferroelectric domain-inverted pattern and a ferroelectric single crystalline film having a ferroelectric domain-inverted structure composed of a ferroelectric domain-inverted pattern with substantially the same shape as the shape of the ferroelectric single crystalline substrate when viewed in a direction vertical to the optical waveguide part.

7. An optical waveguide part as defined in claim 6, wherein the ferroelectric single crystalline substrate is made of a single crystal having a composition of $LiNb_{1-x}TaXO_3$ ($0 \leq X \leq 1$).

8. An optical waveguide part as defined in claim 6 or 7, wherein the ferroelectric single crystalline film is made of a single crystal having a composition of $LiNb_{1-x}TaXO_3$ ($0 \leq X \leq 1$).

* * * * *

UNITED STATES PATENT AND TRADEMARK OFFICE
CERTIFICATE OF CORRECTION

PATENT NO. : 6,654,529 B1
DATED : November 25, 2003
INVENTOR(S) : Tatsuo Kawaguchi and Minoru Imaeda It is certified that error appears in the above-identified patent and that said Letters Patent is hereby corrected as shown below:

Column 1,
Line 11, please change "an=optical" to -- an optical --

Column 3,
Line 15, please change "FIG. 2 is a view" to -- FIGS. 2a and 2b are views --
Line 25, please change "FIG. 5 is a view" to -- FIGS. 5a and 5b are views --

Signed and Sealed this

Twenty-fourth Day of February, 2004

JON W. DUDAS
*Acting Director of the United States Patent and Trademark Office*